Oct. 20, 1953  P. E. FISCHER ET AL  2,656,060
SHIPPING CASE UNLOADING APPARATUS
Filed Jan. 20, 1945  13 Sheets-Sheet 1
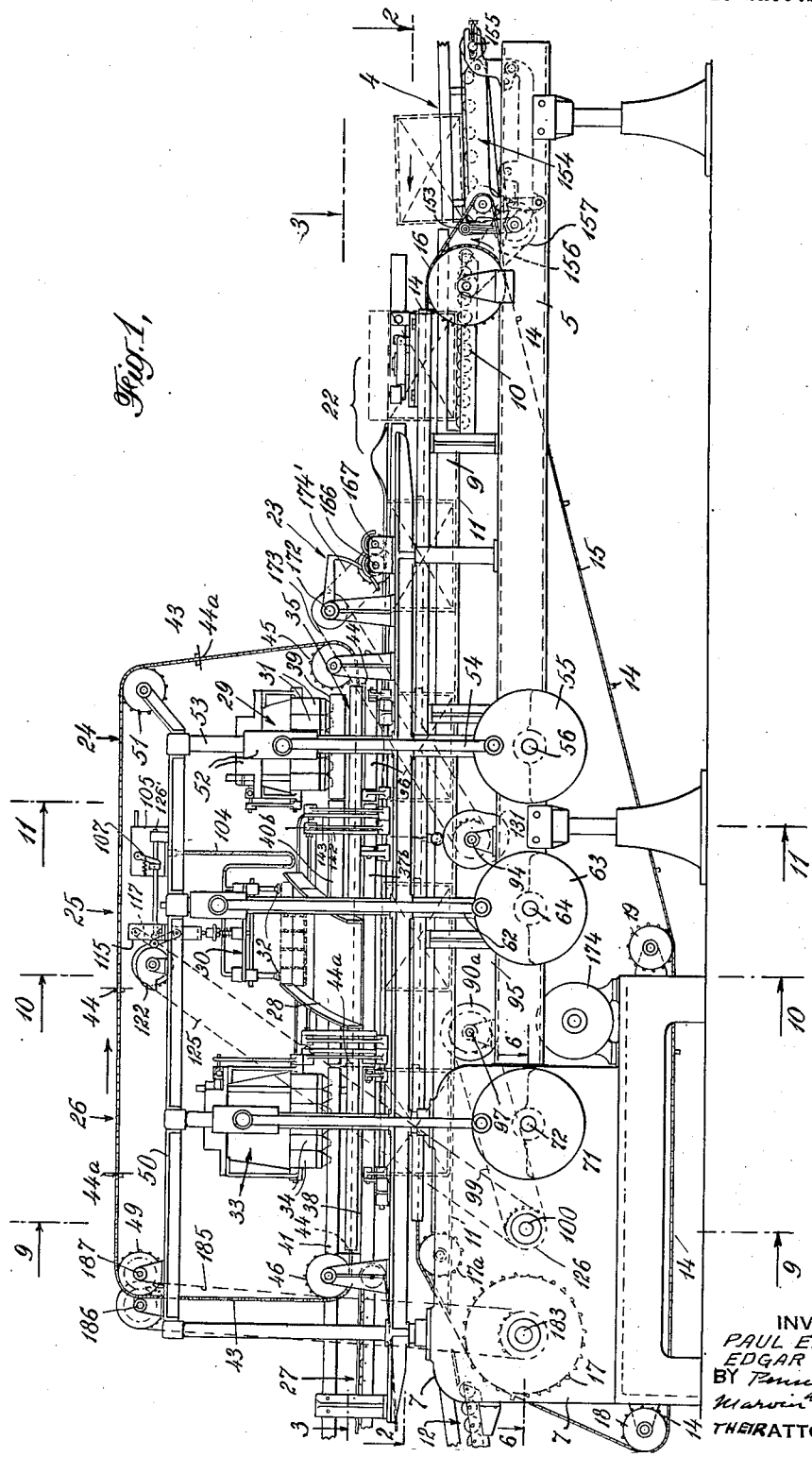
INVENTORS
PAUL E. FISCHER
EDGAR ARDELL
BY
THEIR ATTORNEYS

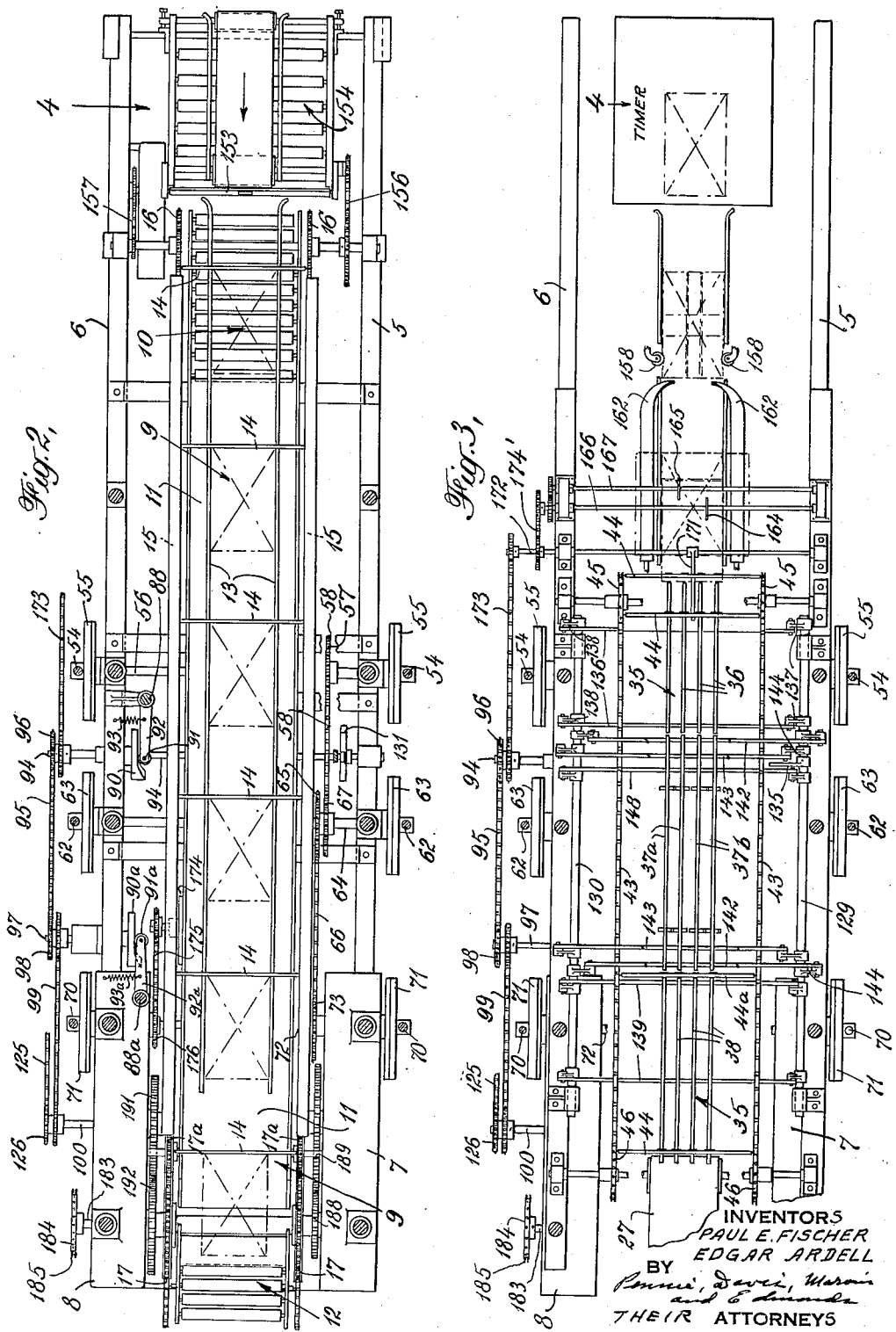

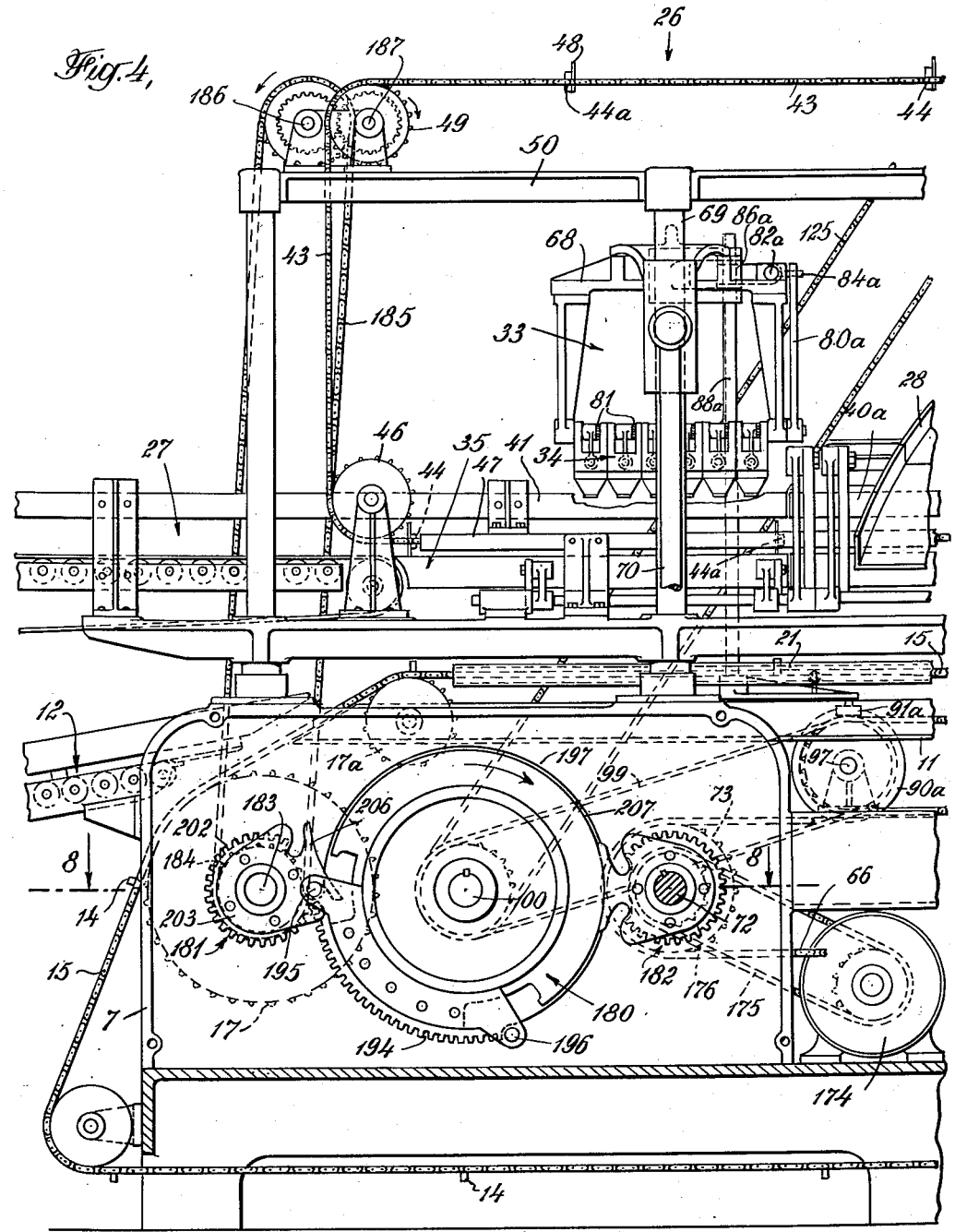

Oct. 20, 1953   P. E. FISCHER ET AL   2,656,060
SHIPPING CASE UNLOADING APPARATUS
Filed Jan. 20, 1945   13 Sheets-Sheet 4
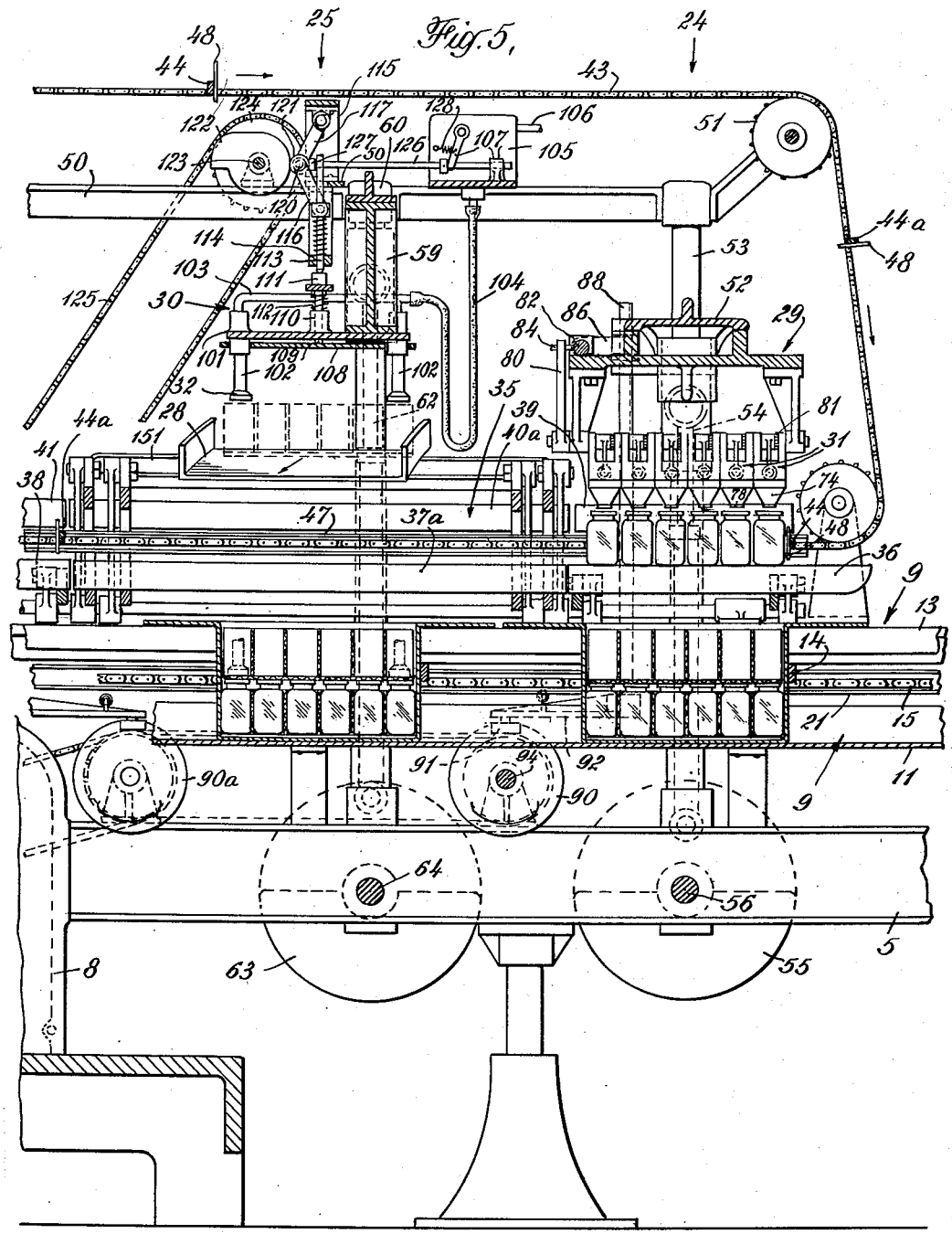
INVENTORS
PAUL E. FISCHER
EDGAR ARDELL
BY
THEIR ATTORNEYS Oct. 20, 1953  P. E. FISCHER ET AL  2,656,060
SHIPPING CASE UNLOADING APPARATUS
Filed Jan. 20, 1945  13 Sheets-Sheet 5
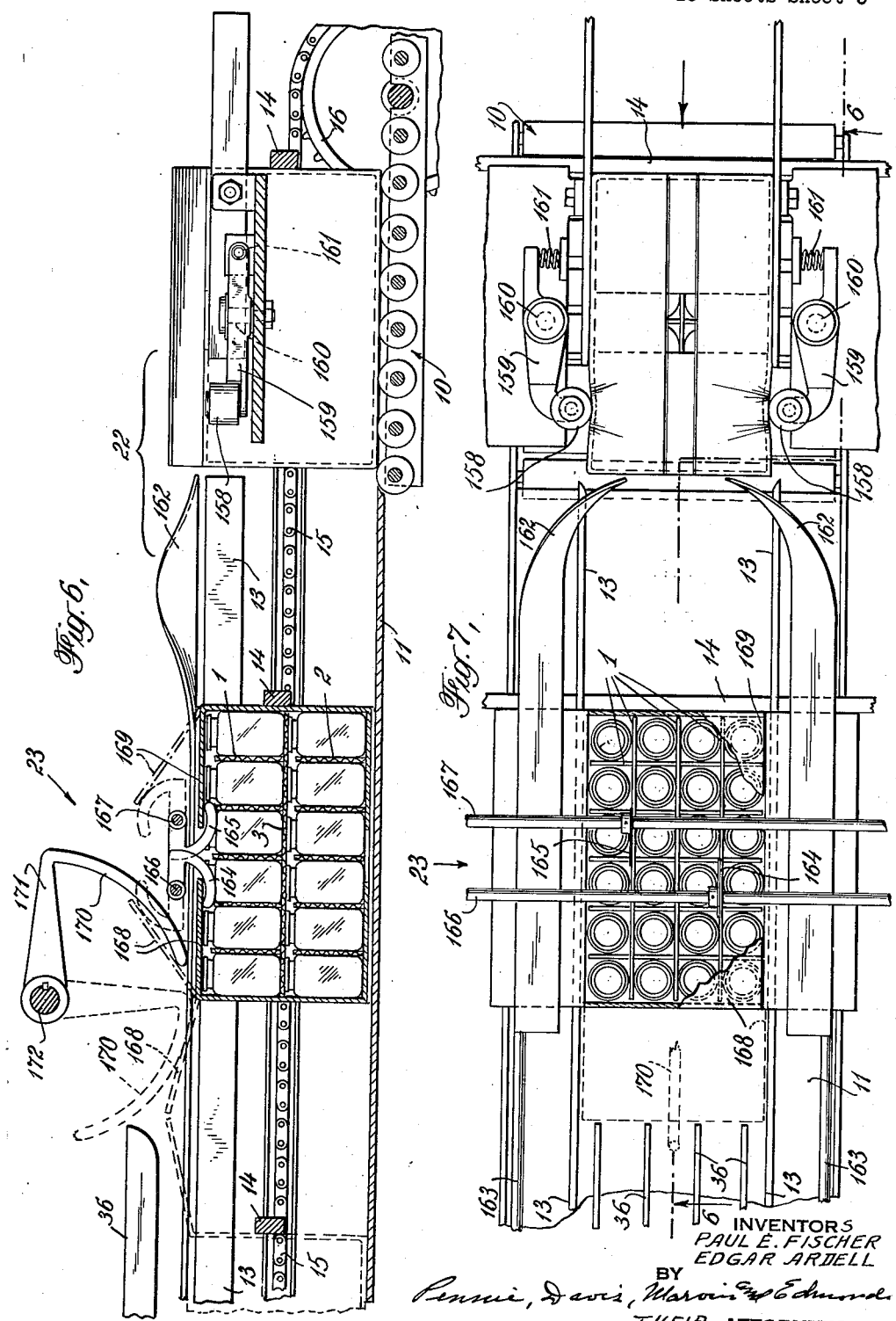
INVENTORS
PAUL E. FISCHER
EDGAR ARDELL
BY
Pennie, Davis, Marvin & Edmonds
THEIR ATTORNEYS

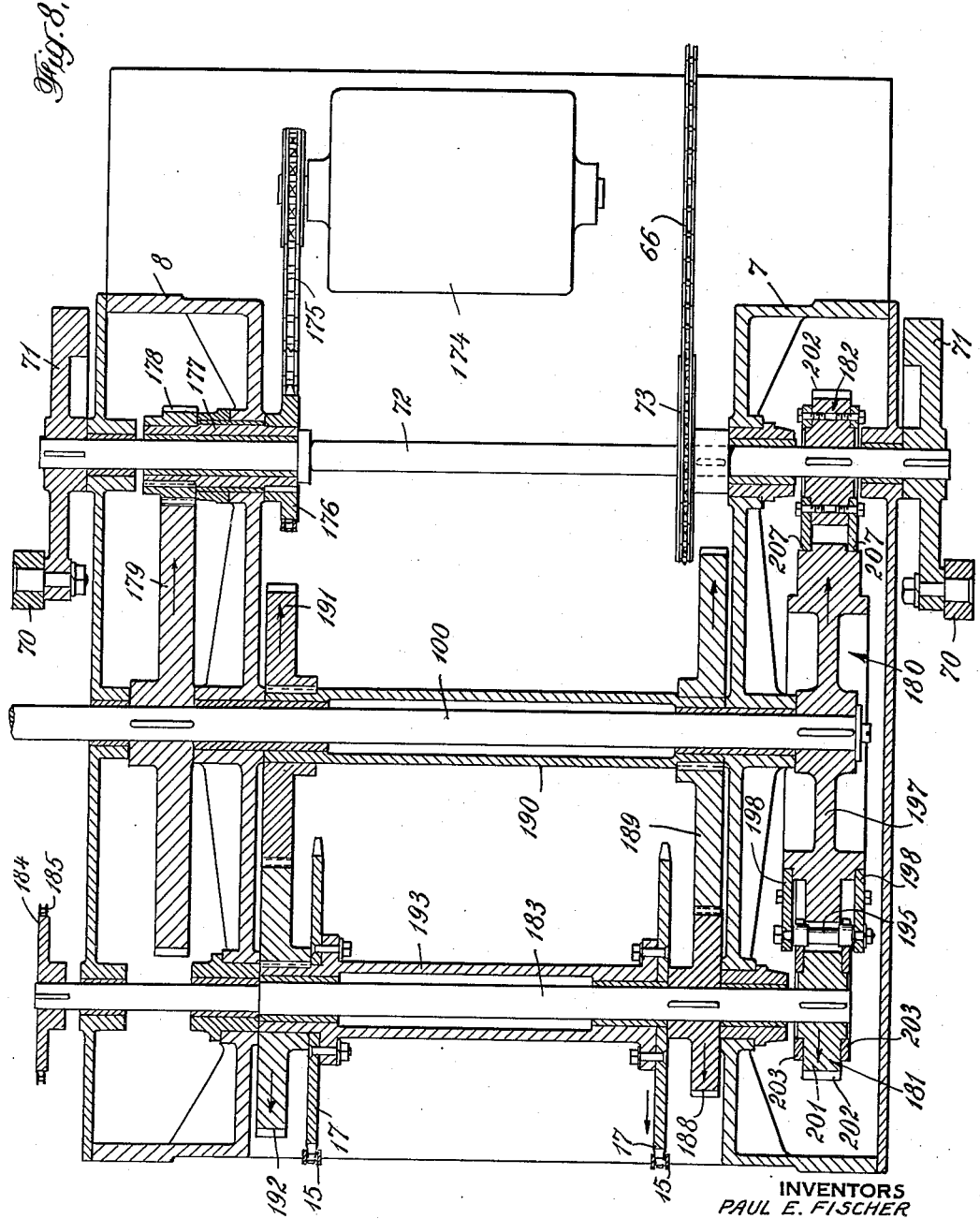

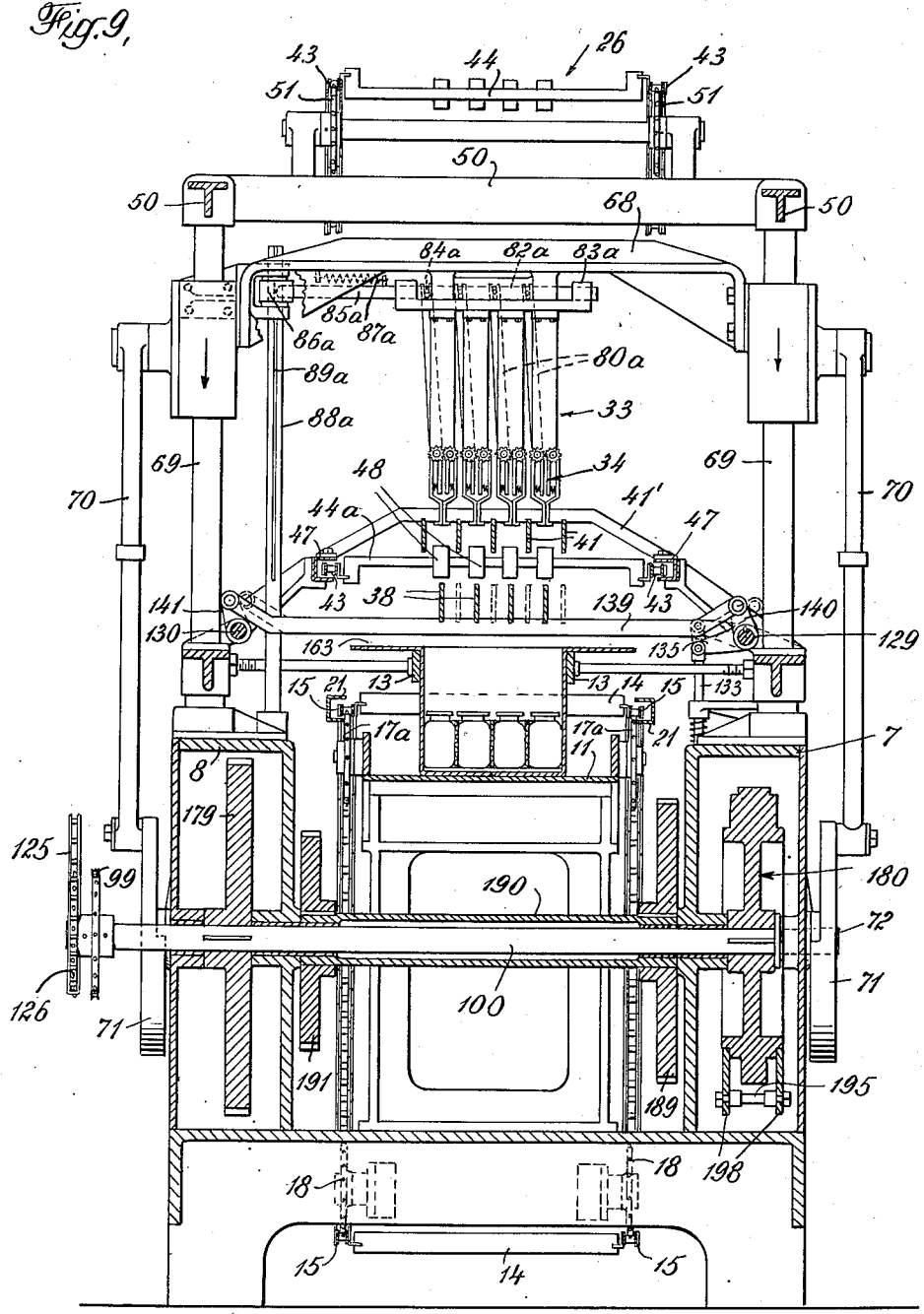

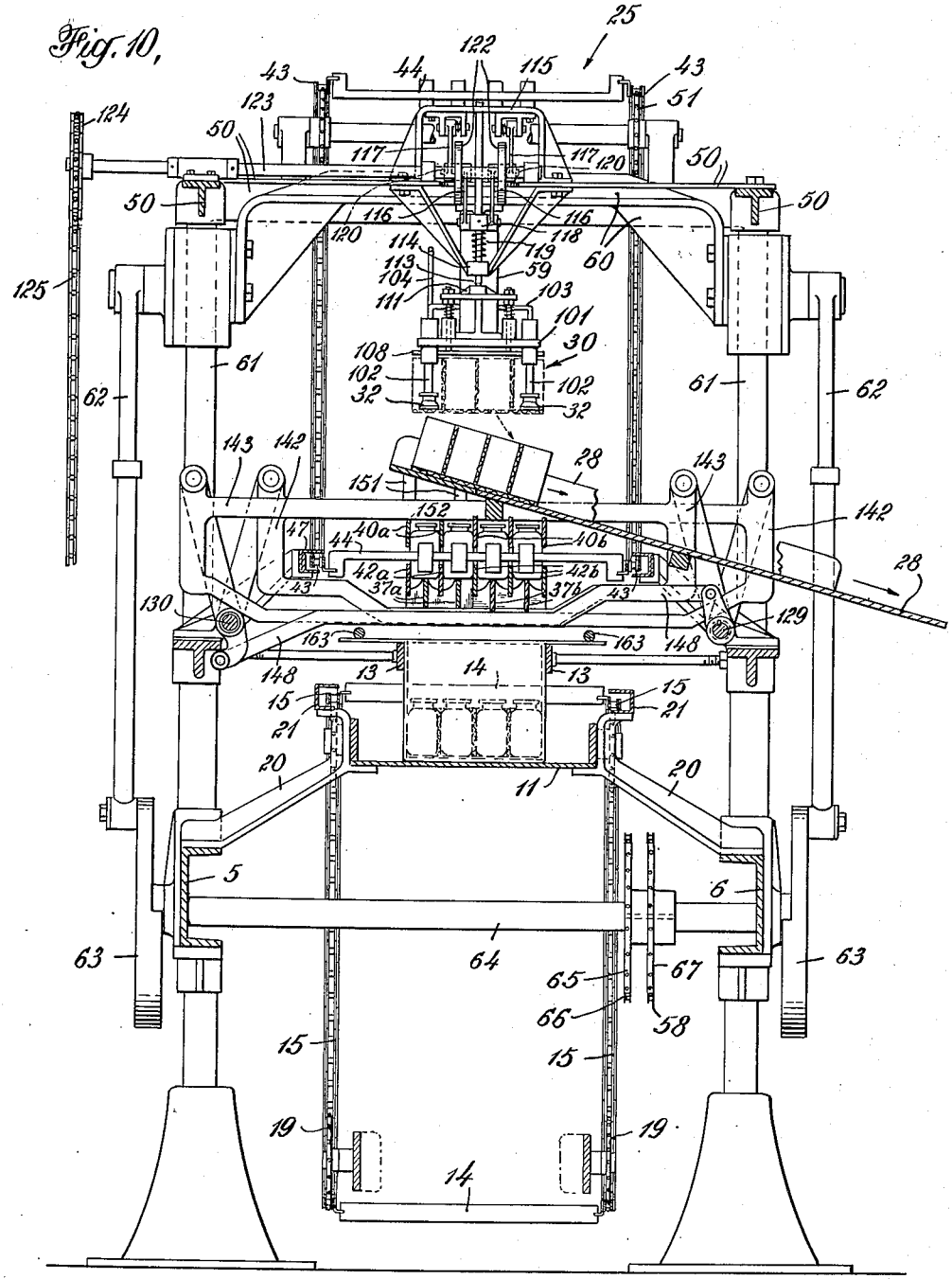

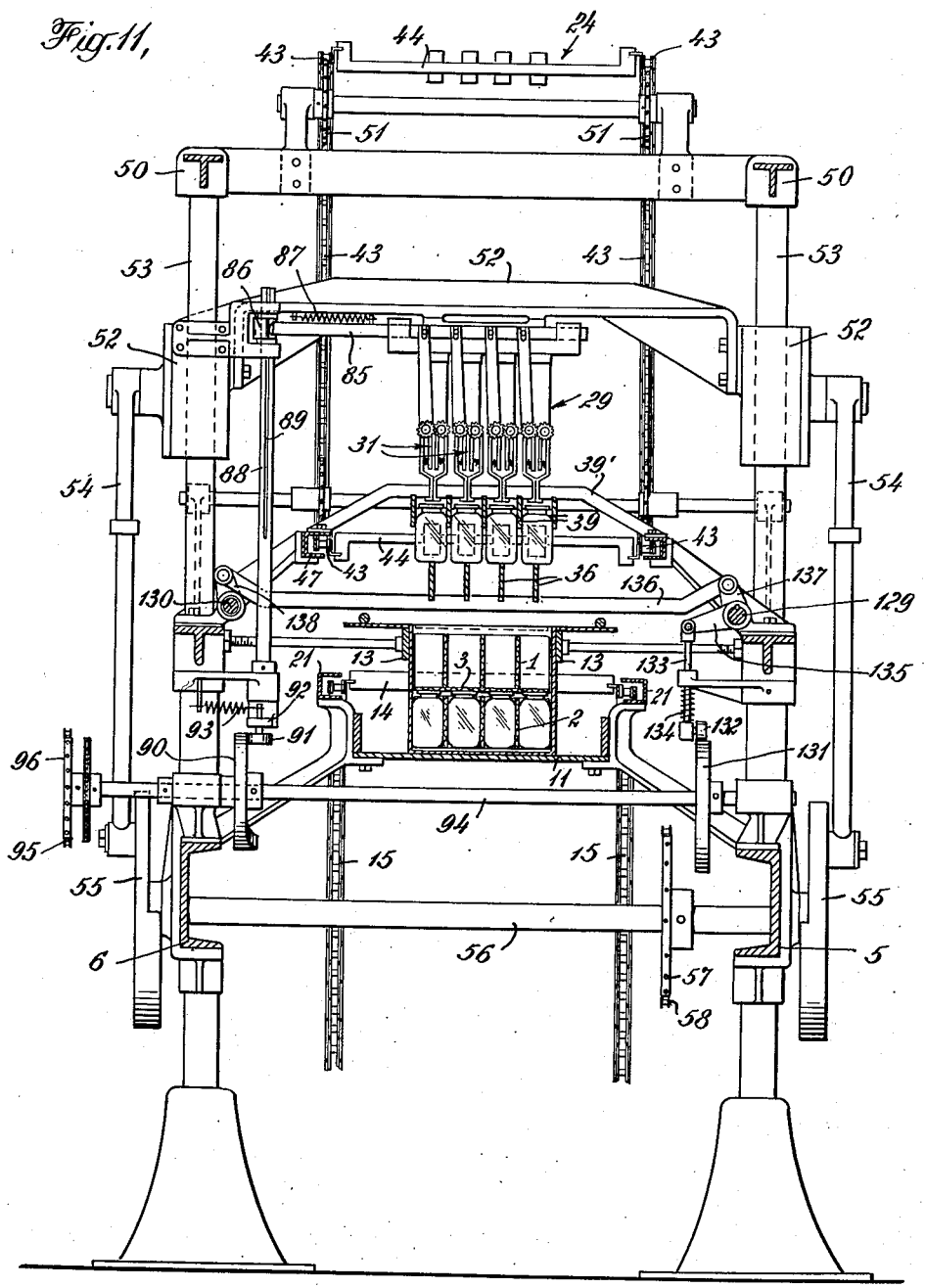

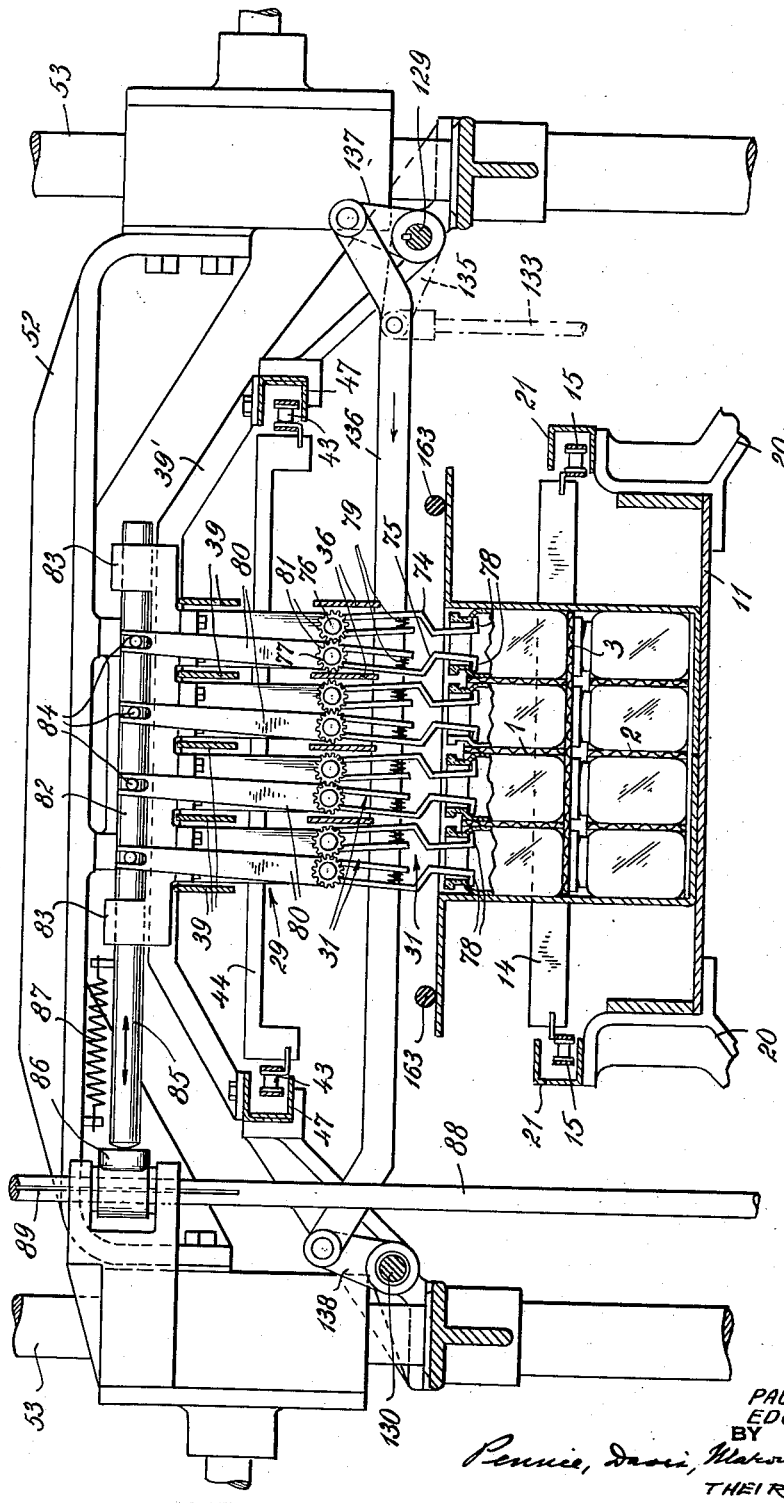

Oct. 20, 1953     P. E. FISCHER ET AL     2,656,060
SHIPPING CASE UNLOADING APPARATUS
Filed Jan. 20, 1945     13 Sheets-Sheet 11
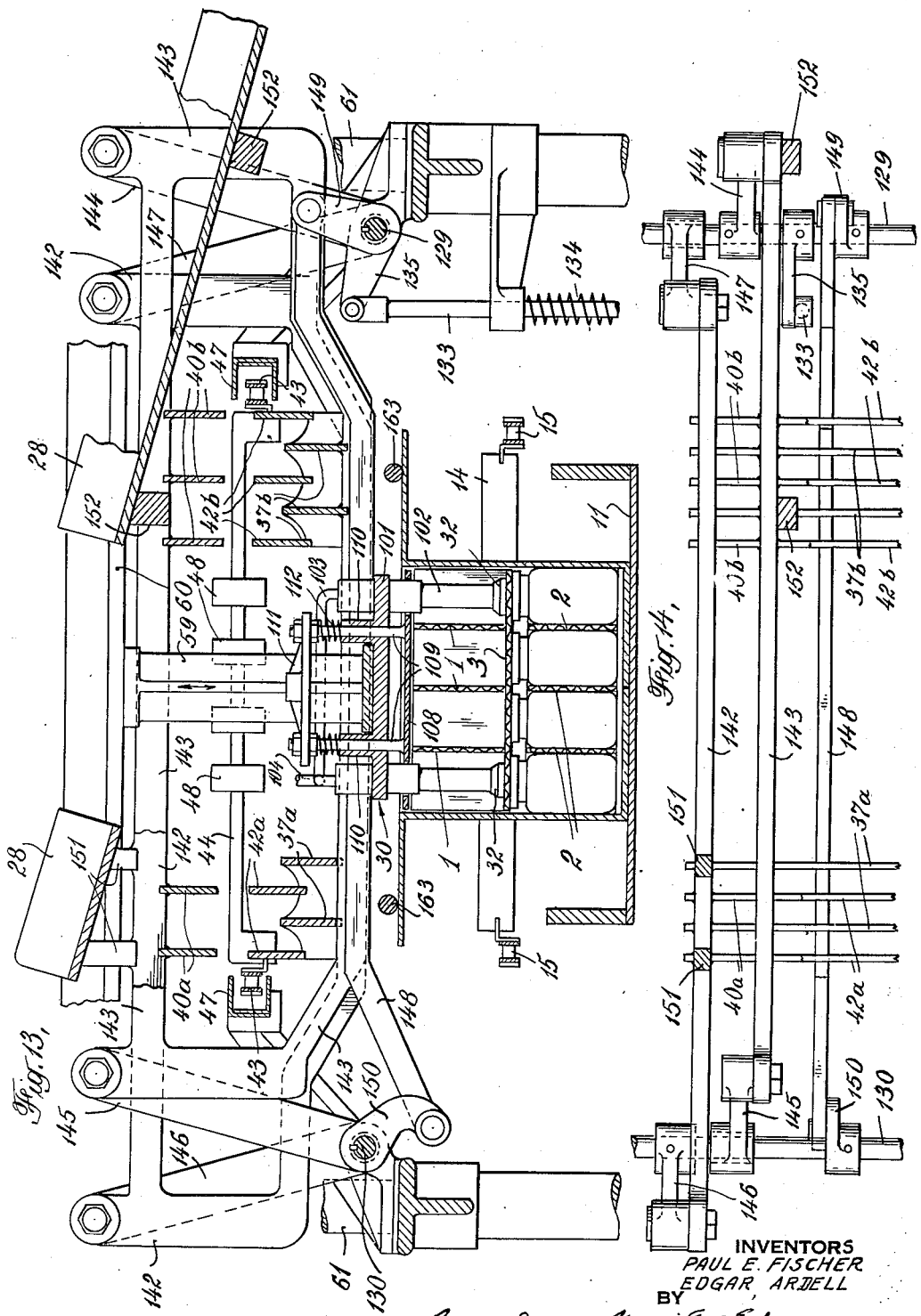
INVENTORS
PAUL E. FISCHER
EDGAR ARDELL
BY
THEIR ATTORNEYS

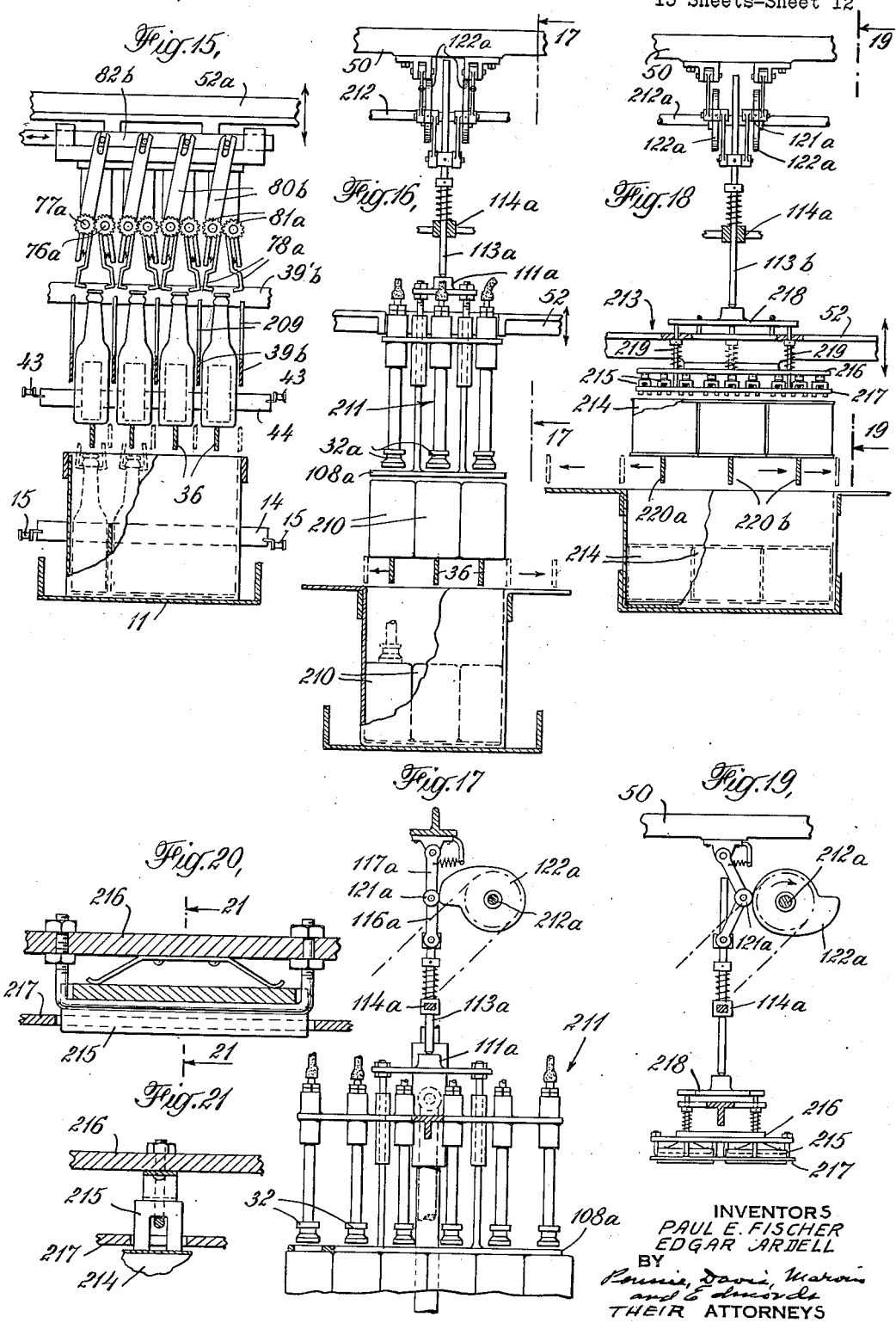
Oct. 20, 1953   P. E. FISCHER ET AL   2,656,060
SHIPPING CASE UNLOADING APPARATUS
Filed Jan. 20, 1945   13 Sheets-Sheet 12
INVENTORS
PAUL E. FISCHER
EDGAR ARDELL
THEIR ATTORNEYS

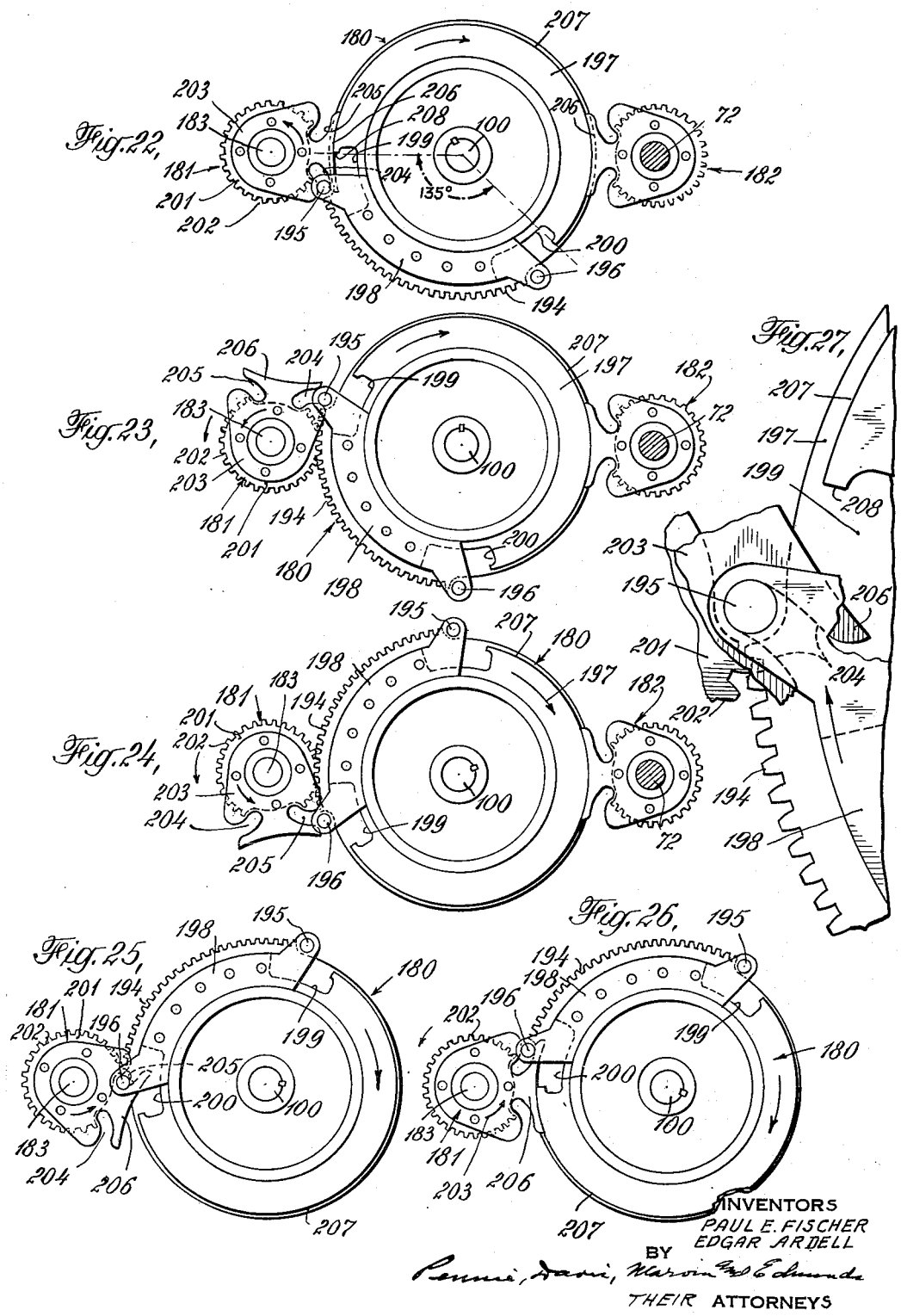

Patented Oct. 20, 1953

2,656,060

UNITED STATES PATENT OFFICE 2,656,060

SHIPPING CASE UNLOADING APPARATUS

Paul E. Fischer, Portland, and Edgar Ardell, Middletown, Conn., assignors, by mesne assignments, to Emhart Manufacturing Company, a corporation of Delaware Application January 20, 1945, Serial No. 573,802

12 Claims. (Cl. 214—309)

This invention relates to apparatus for automatically unloading shipping cases such as are used for containers such as glass jars, bottles, and paper or metal cans or other articles. More specifically the invention relates to apparatus for removing articles from shipping cases of the type that are closed by folded flap extensions of the side and end walls to form the tops and also, usually, the bottoms of the shipping cases, such cases ordinarily being made of corrugated board or fiber board. The apparatus, however, can also be used for unloading cases which do not have flaps and which may be made of other materials, such as wood, metal, etc.

In industries in which food and other products are packed in containers such as those made of glass or paper, or metal cans which have lithographed labels which are easily marred, it is customary for the manufacturer of the containers to supply the food product manufacturer not only with the containers themselves but also with the shipping cases in which the food or other product is to be shipped. These shipping cases, properly printed as designated by the food manufacturer, are filled with the empty food containers, the bottoms of the shipping cases being permanently sealed, but the tops of the shipping cases having their flaps folded to closed position but left unsealed. Consequently, when the food manufacturer receives these cases of empty containers it is necessary to remove the containers for the purpose of filling them with the particular food product, and closing and labeling them. After this the containers may be repacked in the same shipping cases.

The empty containers are packed in the shipping cases with partitions between the individual containers, such as crisscross partitions made of corrugated board. They also have separating pads, usually of the same material, between the tiers or layers, if the shipping case contains more than one layer. It is therefore also necessary to remove this partitioning, that is, both the partitions and the separating pads. Machines have heretofore been proposed for unloading containers, such as glass bottles, from shipping cases, by gravity, but these machines are successful only when the bottles fit loosely enough into their cells between the partitions so that they will fall out when the case is turned upside down. Such loose packing does not, however, in many instances, provide sufficient protection for the containers, and the present invention aims to provide apparatus which will automatically unload shipping cases in which the containers are packed snugly between the partitions.

Another object of the invention is to provide an automatic shipping case unloading apparatus for unloading cases containing two or more tiers or layers of containers.

A further purpose of the invention is to provide an apparatus of the class described which will remove the partitioning separately from the containers.

Another object of the invention is to provide such an apparatus which will remove as a unit the partitions and separating pad for a single tier of articles.

A further object of the invention is to provide an apparatus which will automatically unload shipping cases having their top flaps closed but unsealed.

The invention will be described in connection with the embodiment shown, by way of example, in the accompanying drawings, in which the shipping cases or cartons to be unloaded are provided with flaps for closing the tops thereof, these cases being received in the apparatus with such flaps closed but unsealed, the cases containing two layers of large-mouth glass jars such as are used for baby food and other food products. Also in the embodiment of the invention illustrated the apparatus is provided with three lifting heads at three unloading stations. The first of these lifts from the shipping case the top tier of jars. The second lifts out the partitions for the top tier of jars and the separating pad between the tiers. The third lifts out the second or bottom tier of jars. It will be understood, however, that additional unloading stations may be included should it be desired to unload shipping cases containing more than two tiers.

Also in the embodiment of the invention disclosed the lifting heads for the jars are provided with gripping devices which enter the open mouths of the jars and grip the jars from the inside. It will be understood, however, that outside gripping devices may be used if desired if, for example, a shipping case should contain bottles instead of jars. It will be further understood that any suitable type of gripping device or lifting device may be provided on these lifting heads, depending upon the type of article or container to be removed from the shipping cases and whether the containers are empty or filled, light in weight or heavy; such, for example, as mechanical grippers of either the inside or outside type, pneumatic cups or lifting devices, or magnetic lifting devices, the last being used for unloading shipping cases filled with metal cans or with jars which have metal caps.

Referring now to the accompanying drawings:

Fig. 1 is a view in side elevation of the apparatus as a whole which includes three unloading stations;

Fig. 2 is a view in horizontal section taken on the line 2—2 of Fig. 1 and drawn to the same scale as Fig. 1;

Fig. 3 is a view similar to Fig. 2 but taken on the line 3—3 of Fig. 1;

Fig. 4 is a side elevation drawn to an enlarged scale showing the left-hand end of the apparatus including the third unloading station. The cover is removed from the casing which houses the intermittent driving mechanism;

Fig. 5 is a vertical central longitudinal section of the central part of the apparatus showing the first and second unloading stations;

Fig. 6 is a similar section of the upper portion of the apparatus immediately to the right of that shown in Fig. 5 and drawn to a still larger scale to illustrate the flap opening mechanism. This section is taken on broken line 6—6 of Fig. 7;

Fig. 7 is a plan view of the parts shown in Fig. 6, drawn to the same scale;

Fig. 8 is a horizontal section taken on the line 8—8 of Fig. 4 but drawn to a larger scale to further illustrate the intermittent driving mechanism and its connected parts;

Fig. 9 is a vertical transverse section taken on the line 9—9 of Fig. 1 looking towards the right adjacent the third unloading station and drawn to approximately the same scale as Figs. 4 and 5;

Fig. 10 is a view similar to Fig. 9 taken on the line 10—10 of Fig. 1 looking in the same direction adjacent the second unloading station;

Fig. 11 is a similar view taken on line 11—11 of Fig. 1, also looking in the same direction and adjacent the first unloading station;

Fig. 12 is a fragmentary transverse vertical section of a portion of Fig. 11 but showing certain parts in a different position and drawn to a greatly enlarged scale;

Fig. 13 is a view of certain parts shown in Fig. 10 but with these parts shifted to a different position;

Fig. 14 is a plan view of the parts shown in Fig. 13;

Fig. 15 is a transverse vertical section similar to the central portion of Fig. 12 but drawn to a smaller scale and illustrating a modified form of lifting head;

Figs. 16 and 17 illustrate another form of lifting head, Fig. 16 being somewhat similar to Fig. 15, and Fig. 17 being a vertical section taken on line 17—17 of Fig. 16;

Fig. 18 is a view similar to Fig. 16 of still another modification of the lifting head;

Figs. 19, 20 and 21 show details of the mechanism of Fig. 18. Fig. 19 is a vertical section taken on line 19—19 of Fig. 18. Fig. 20 shows the details of the mounting of one of the lifting head magnets of Fig. 18, Fig. 21 being a section taken on line 21—21 of Fig. 20; and Figs. 22 to 27, inclusive, show the intermittent driving mechanism in different positions to illustrate its operation.

Referring now to the accompanying drawings, and first to Figs. 6 and 7, the shipping case which is unloaded by the particular apparatus to be described as one embodiment of the invention is a shipping carton made of corrugated board or fiber board, containing two tiers or layers of large-mouth glass jars. These jars are empty and have no covers on them. They are to be filled by the user of the unloading apparatus with, for example, a food product such as baby food. Each tier contains twenty-four jars arranged in four rows of six jars each. Corrugated board partitioning is used to separate the individual jars of each layer and also to separate the two layers. Thus crisscross partitions 1 separate the individual jars of the upper tier and similar crisscross partitions 2 those of the lower tier, while the two tiers are separated by a flat pad 3.

The cases filled with these empty jars and having their top flaps closed but unsealed enter the right-hand end of the unloading apparatus as shown in Figs. 1, 2, and 3 by means of an automatic timer indicated generally by reference numeral 4, which is supported upon the two longitudinal side frame members 5 and 6 of the apparatus. These frame members terminate at the left-hand end of the apparatus in housings 7 and 8 which contain gearing and intermittent drive mechanism to be described. Frame members 5 and 6 also support centrally between them a case guideway indicated generally by reference numeral 9 (Fig. 2) and extending from the timer 4 entirely through the apparatus.

Guideway 9 comprises a short roller bed 10 adjacent timer 4 and a horizontal metal plate 11 which extends from roller bed 10 to the delivery conveyor 12 for empty cases at the left-hand end of the apparatus. It also includes side guides 13 for confining the cases to a definite path as they pass through the apparatus. The cases are moved along this guideway by means of flight bars 14 carried by a pair of intermittently operated flight chains 15. These flight chains are supported at their right-hand ends by means of idler sprockets 16 and at their left-hand ends by idler sprockets 17a which direct the chains downward into engagement with driving sprockets 17 and thence around idler sprocket 18 and beneath idler sprockets 19 to the right-hand end of the machine.

Plate 11 on which the cases slide is supported on brackets 20 (Figs. 1 and 10) which are fixed in appropriately spaced relation along side frame members 5 and 6. Flight chains 15 are supported between idler sprockets 16 and 17 in horizontal guide channels 21 in which the chains travel throughout the length of the machine. These guide channels are also supported on brackets 20.

The cases entering the machine at the right-hand end are fed between successive flight bars 14 by the timer 4. The intermittently operated flight chains 15 carry the cases forward at each step a distance equal to the distance between adjacent flight bars. During the first step by step movement of a case by one of the flight bars 14 the upper portion of the case is brought into engagement with mechanism for opening the outer or side flaps to outwardly extending horizontal position, which mechanism is indicated generally by numeral 22 (Figs. 6, 7, and 1). At the end of this first step movement the case arrives at an inner flap opening station, indicated generally by numeral 23. While the case remains at rest at this station the inner or end flaps are opened to a similar outward horizontal position by mechanism to be described.

The next advance of flight chains 15 carries the case to the first unloading station, indicated generally by numeral 24, and while the case remains at rest at this station the upper tier of jars is lifted out of the open top of the case. The succeeding movement of flight chains 15 carries the case to the second unloading station 25 at which the partitioning consisting of the crisscross partitions 1 and the separating pad 3 are lifted out of the case. When the next movement of flight chains 15 has taken place the case arrives at the third unloading station 26 where the second or lower tier of jars is lifted out, leaving the crisscross partitions 2 remaining in the case. On the following step movement of the flight chains the case with the lower partitions 2 in it is discharged from the apparatus onto conveyor 12.

The jars constituting both the upper and lower container tiers are discharged from the apparatus onto a conveyor 27 by which they may be carried to a filling apparatus for the containers. The partitioning which was removed from the case at the second unloading station 25 is discharged from the apparatus in a guideway or conveyor in the form of a laterally projecting chute 28. This partitioning may be immediately reinserted by the operator of the apparatus in an empty case on conveyor 12. If desired, however, the partitioning may be discharged from chute 28 onto a suitable conveyor to deliver it at the case packing machine where the cases are repacked with the jars after they have been filled with the product which they are to contain.

At the first unloading station 24 there is a vertically reciprocable lifting head 29 which is equipped with twenty-four jar lifting devices 31, one for each jar of the upper tier. At the second unloading station there is a vertically reciprocable lifting head 30 which has four suction cups 32 by which the partitioning is lifted out of the case. The third unloading station 26 has a reciprocable lifting head 33 which carries jar lifting devices 34 which are not unlike the lifting devices 31 and by which the jars of the lower tier are lifted out of the case.

Mechanism is provided (to be described) for reciprocating the three lifting heads 29, 30 and 32 simultaneously. After the first few advances of the case flight chains 15 there will be a shipping case at each of the three unloading stations and thereafter upon each reciprocation of the three lifting heads and each advance of flight chains 15 a case will be completely unloaded.

To receive the jars after they have been lifted by the lifting heads 29 and 33 and deliver them to the conveyor 27, a second guideway for these jars or containers is provided, indicated generally by numeral 35. Guideway 35 comprises three sections of container supporting rails, indicated by numerals 36, 37a, 37b, and 38 (Figs. 3, 5, and 1), placed end to end to extend from the first unloading station 24 to the container delivery conveyor 27.

Each of these guideway sections consists of four parallel rails, one for each of the four rows of jars in a tier. Container guideway 35 also comprises three sections of container guide bars to keep the jars in upright position on their supporting rails. The first section of these guide bars is indicated by numeral 39 in Fig. 5; the second section by numerals 40a and 40b; and the third section by numeral 41 (see also Figs. 3 and 1). The central section also is provided with lower guide bars 42a and 42b shown only in Figs. 10 and 13.

The first section of guideway 35 (rails 36 and guide bars 39) is at the first unloading station 24. The second section, consisting of rails 37a and 37b, upper guide bars 40a and 40b, and lower guide bars 42a and 42b, is at the second unloading station 25. The third section, comprising rails 38 and guide bars 41, is at the third unloading station 26. The guide bars 39 and 41 for the first and third unloading stations are stationary and are supported by arched cross members 39' and 41' (Figs. 11 and 9). The sections of rails 36 and 38 at their respective unloading stations are arranged to be laterally shiftable, as will be described in detail, and are shifted into vertical alignment with their corresponding stationary guides 39 and 41 to allow the lifting devices 31 and 34 of lifting heads 29 and 33 respectively to descend between them into the cases to lift out the jars.

The section of rails 37a and 37b, guides 40a and 40b and 42a and 42b at the second unloading station 25 are arranged to be laterally shiftable in groups (designated by the letters "a" and "b") to separate from each other as shown in Fig. 13 to allow the suction lifting head 30 to descend and lift out the crisscross partitions 1 and separator pad 3. This is necessary because in the embodiment of the invention illustrated the partitioning chute 28 is disposed above the container guideway 35. In order for lifting head 30 to deposit the partitioning on chute 28 the chute itself is also made in two separable sections (Fig. 13), its upper portion shifting laterally with rails 37a and guides 40a and 42a, and the lower section of the chute shifting with rails 37b and guides 40b and 42b.

The partitioning 1, 3, when deposited in chute 28 by the suction lifting head 30, is removed from the apparatus by gravity on the inclined chute. It is necessary, however, to propel the containers deposited on rail sections 36 and 38 of container guideway 35 at the first and third unloading stations 24 and 26 to the container conveyor 27 at the left-hand end of the apparatus. Movement of these containers must take place at the completion of each upward stroke of the lifting heads and it is made to take place simultaneously with the advance of the cases by flight chains 15.

Such movement of the containers in their supporting rails is accomplished by means of container flight chains 43 which carry between them 3 pairs of spaced flight bars 44, 44a. Bars 44 move the containers at the first unloading station 24 and the bars 44a those at the third unloading station 26. While the cases are advancing from one station to the next, both groups of containers which have been deposited in the container guideway 35 at the unloading stations 24 and 26 are moved clear of rail section 38 of this guideway and delivered to conveyor 27. Accordingly, flight chains 43 and 15 move simultaneously but flight chains 43 move faster.

Flight chains 43 are supported by pairs of idler sprockets 45 at the right-hand end of container guideway 35 and by similar sprockets 46 at the left-hand end. During their movement along the container guideway 35 they are maintained in a straight horizontal path by means of stationary guide channels 47 (Figs. 10 and 13) which are similar to the guide channels 21 for case flight chains 15. Container flight bars 44 are preferably provided with container engaging pads, one in line with each of the four rows of jars which are propelled forward by the flight bars. As the flight chains 43 pass around sprockets 46 they are carried upwardly over drive sprockets 49 (Fig. 1) which are mounted on an upper framework 50 which also aids the main frame of the apparatus in supporting the mechanism of lifting heads 29, 30 and 31. Flight chains 43 then move toward the right-hand end of the machine and after passing around idler sprockets 51, also mounted on frame 50, they return to the sprockets 45.

The mounting of lifting heads 29, 30 and 31 for vertical reciprocation will now be described. Lifting head 29 (Fig. 11) for the first unloading station is mounted on the underside of a carriage 52, the ends of which are arranged to slide on vertical posts 53, one on each side of the apparatus and forming a part of the machine frame. Connecting rods 54 are pivoted to the carriage at their upper ends and operated from their lower ends by crank disks 55 which are keyed to the opposite ends of a cross shaft 56, this shaft rotating in journals supported by the two longitudinal frame members 5 and 6. Rotation of shaft 56 by a sprocket 57 fixed thereto and chain 58 (Fig. 2) produces the reciprocating movement of carriage 52 and lifting head 29.

Referring now to Fig. 13, lifting head 30 for the second unloading station is attached by means of a spacing member 59 to a second vertically movable carriage 60 (Figs. 5, 10 and 13). Carriage 60 slides on vertical posts 61 and is operated by connecting rods 62 from crank disks 63. Crank disks 63 are keyed to a cross shaft 64 mounted parallel with cross shaft 56. Shaft 64 is driven by a sprocket 65 keyed thereto and a chain 66 trained around it (Fig. 2). Shafts 56 and 64 are interconnected by chain 58 which passes around a driving sprocket 67 adjacent sprocket 65 on shaft 64.

Referring now to Figs. 4 and 9, lifting head 33 for the third unloading station is mounted beneath a vertically reciprocating carriage 68 which slides on vertical posts 69 and is connected by rods 70 with its operating crank disks 71. Crank disks 71 are keyed to the outer ends of a third cross shaft 72 which is also parallel with shafts 56 and 64. Shaft 72, however, is journaled in the driving gear housings 7 and 8 (Fig. 8). Chain 66 which drives cross shaft 64 and through it cross shaft 56, is operated by a driving sprocket 73 keyed to shaft 72. Shaft 72 is driven intermittently by the intermittent drive mechanism shown in Figs. 4 and 8 to be later described.

It will be understood that the crank throw of crank disc 71 is greater than that of crank disc 55 since the cases keep the same level throughout the apparatus and the extent of vertical travel of gripper head 33 is greater than that of gripper head 29 in order to engage the lower tier of containers.

The lifting devices 31 which are carried by lifting head 29 at the first unloading station are shown in detail in Figs. 11 and 12. Each of these lifting devices comprises a pair of internal gripping members 74 and 75. These members are fixed in pairs in spaced relation on parallel shafts 76 and 77, respectively, which are journaled on lifting head 29. There are four pairs of such shafts corresponding to the four rows of lifting devices, and six pairs of gripping members 74, 75 on each shaft. Gripping members 74, 75 terminate at their lower ends in outwardly projecting lugs 78 adapted to engage the shoulder of a jar just below its mouth, as shown in Fig. 12. Fingers 74 and 75 are biased away from each other by means of helical springs 79.

In order to actuate fingers 74, 75 simultaneously so as to release or pick up the containers, each shaft 77 has an actuating arm 80 extending above it and the pairs of shafts 76, 77 are interconnected by intermeshing pinions 81. To rock the actuating arms 80 to the left or right an operating bar 82 is arranged to slide laterally in guides 83 on carriage 52, this member being provided with a series of pins 84 which engage slots at the upper ends of actuating arms 80. Operating bar 82 is shifted by means of a rod 85 fixed thereto and projecting to the left into engagement with a short arm 86, being biased toward the left by means of a coil spring 87 which holds rod 85 in engagement with this arm.

Arm 86 is arranged to move up and down with carriage 52, the rocking movement of shaft 88 on which it is slidably mounted being communicated to arm 86 by means of a slidable key 89 so as not to interfere with the reciprocating movement of carriage 52. Rock shaft 88 is journaled in the frame of the apparatus and is actuated by means of a continuously rotating face cam 90 which engages a roller 91 on the left-hand end of a horizontal arm 92 (Figs. 2 and 5) mounted at the lower end of rock shaft 88. A helical spring 93 (Fig. 4) holds roller 91 in engagement with the cam.

Cam 90 is fixed on a cross shaft 94 and operates to cause the engagement of lifting devices 31 with the containers when the lifting head 29 is at the bottom of its stroke, and the actuation of lifting devices 31 to release the containers after the lifting head has reached the top of its stroke. Cross shaft 94 rotates continuously and is driven by means of a chain 95 passing around sprocket 96 located on the rear end of the shaft 94 (Fig. 2). In Fig. 12 the lifting devices have just been actuated to engage the upper tier of containers and in Fig. 11 these jars have been lifted out of the shipping case and have been released by lifting devices 31 onto rails 36.

During the upward movement of the jars they pass between rails 36 as may be understood from Fig. 12, and should the partitions 1, or the case, adhere to the jars, these will be stripped from the jars by the lower edges of rails 36. As previously mentioned rails 36 are shifted laterally into vertical alignment with the stationary guides 39 above them to allow the lifting devices to move between them, and after the tier of containers has been raised to the top of the stroke of carriage 52 rails 36 are again shifted back to their original position so as to support the containers when they are released.

Referring now to Fig. 9 and lifting head 33 for the third unloading station 26, the individual container lifting devices 34 are substantially identical with the lifting devices 31 just described in connection with lifting head 29 for the first unloading station 24. The difference is that lifting devices 34 are mounted lower on their carriage 68 than are the lifting devices 31 on carriage 52 because devices 34 have to reach down and engage the containers of the lower tier in the shipping case. Consequently the operating levers or extensions 80a are somewhat longer.

The operating mechanism for shifting these levers 80a to cause the gripping devices 34 to engage and release the containers is identical with that described above in connection with the operation of lifting devices 31, the various parts being indicated by the same reference numerals with the subscript "a." Cam 90a, however, is keyed to the inner end of a short operating shaft 97 (Fig. 2) which is journaled in suitable bearing brackets secured to side frame member 6. On the outer end of this shaft a double sprocket 98 is keyed, around which is carried a driving chain 99 by which shaft 97 is rotated from a shaft 100 which may be considered as the main operating or drive shaft of the entire apparatus. Double sprocket 98 also carries chain 95 which drives shaft 94.

The mechanism of lifting head 30 for the second unloading station 25 is illustrated in detail in Figs. 5, 10 and 13. This lifting head carries the suction cups 32 which at the lower end of the stroke of reciprocating carriage 60 engage the separator pad 3 (Fig. 13) and lift this pad out of the shipping case together with the upper crisscross partitions 1, which rest on top of the pad. At the top of the stroke of carriage 60 the partitioning is released from the lifting head and drops onto the inclined chute 28. Lifting head 30 is provided with a supporting frame plate 101 which is secured to the lower end of spacing member 59, and four suction cups 32 are mounted at the bottoms of tubular supports 102 which are fixed to the under side of supporting plate 101.

The vertical reciprocation of carriage 60 by crank disks 63 moves lifting head 30 up and down. At the bottom of its stroke it is necessary to connect the tubular supports 102 with a suction pump in order to cause the separator pad 3 to adhere to suction cups 32 and to maintain this connection until the lifting head has reached the top of its stroke. For this purpose each of the four tubular supports 102 is connected by piping 103 mounted on supporting plate 101 to a flexible tubing 104, the upper end of which is connected through a valve 105 to a line 106 leading from a suitable suction pump (not shown).

Valve 105 has an actuating lever 107 which is spring biased to release position in which the flexible connection 104 is cut off from suction pipe 106 and placed in communication with the atmosphere. On account of the time lag involved in equalizing the pressure within suction cups 32 with that of the atmosphere at the instant actuating lever 107 is moved to the release position, it is necessary to provide mechanical stripping means for effecting a prompt removal of the partitioning 1, 3, from the suction cups 32 in order that it may be deposited quickly on the discharge chute 28.

Such stripping mechanism includes a stripping plate 108 which is mounted immediately below supporting plate 101 and adapted to be shifted downwardly with respect thereto at the proper time thereby engaging the upper edges of crisscross partitions 1 and forcing the partitioning loose from suction cups 32. Stripping plate 108 is supported by two posts 109 secured to the upper surface thereof and extending through guides 110 in which these posts slide. Posts 109 are connected together at their upper ends by means of a yoke 111 and between this yoke and the upper ends of guides 110 there are two coil springs 112 which support the stripping mechanism in its normal or upward position.

These parts of the stripping mechanism reciprocate with lifting head 30 and the stripping mechanism is actuated by means of a vertically shiftable rod 113 mounted on the stationary frame of the apparatus. Yoke 111 moves into juxtaposition with the lower end of this rod when lifting head 30 reaches the upper end of its stroke and at this instant rod 113 is shifted downwardly to engage yoke 111 and actuate the stripping mechanism.

Actuating rod 113 is mounted with its lower end sliding in a stationary guide 114 at the lower part of a bracket which is bolted to a cross member of upper framework 50. At its upper end rod 113 is guided in an aperture in a U-shaped bracket 115 (Fig. 10) also mounted on framework 50.

Actuating rod 113 is moved up and down by means of a double toggle mechanism shown in Figs. 10 and 5, which includes two lower toggle levers 116 and two upper toggle levers 117. The lower toggle levers are pivoted to a collar 118 which is pinned on rod 113, this rod being biased upwardly by means of a helical spring 119 beneath this collar. The upper toggle levers 117 are pivoted at their upper ends to the U-shaped bracket 115. The two pairs of toggle levers are joined together by pins 120 which carry rollers 121 (Fig. 5), these rollers cooperating with cams 122. Cams 122 are keyed to a cross shaft 123 suitably journaled in upper framework 50 and continuously rotated by means of a sprocket 124 and a chain 125 which is trained over a sprocket 126 (Fig. 2) at the end of main operating shaft 100.

Actuating lever 107 of vacuum valve 105 is operated by means of a horizontal rod 126 (Fig. 5) at the left-hand end of which there is a bifurcated yoke 127 (Fig. 5) connected to the pins 120 which support rollers 121. A helical spring 128 serves to bias lever 107 toward release position and rollers 121 into engagement with cams 122.

At each reciprocation of the lifting heads 29 and 33 for the first and third unloading stations 24 and 26, container supporting rail sections 36 and 38 have to be shifted into alignment with stationary container guides 39 and 41. Also, during each stroke of lifting head 30 for the second unloading station 25, chute 28, container guides 40a and 40b, 42a and 42b, and container supporting rails 37a and 37b have to be moved out of the path of the lifting head and then returned to their original positions. The mechanism for accomplishing this will now be described.

Referring to Fig. 3, along each side of the apparatus there extend two parallel rock shafts 129 and 130. Rail sections 36 and 38 are shifted by rock shaft 129 and this shaft is actuated by means of a cam 131 fixed to continuously rotating shaft 94 (Figs. 11 and 1). This cam engages a roller 132 at the lower end of a vertically movable rod 133 which is biased downwardly by a helical spring 134 and which is connected at its upper end to a short arm 135 fixed to rock shaft 129. Rail sections 36 (Figs. 11 and 3) are mounted on a pair of horizontal cross bars 136. These bars are supported for lateral shifting movement, being pivoted at their opposite ends to two pairs of short arms 137 and 138. Arms 137 are keyed to their actuating shaft 129 (Fig. 11), while arms 138 are loosely mounted on shaft 130 which serves merely as a support for them. Hence, bars 136 and container rails 36 are shifted laterally by the rocking of shaft 129 by cam 131. When cam roller 132 is on the circular part of the cam, rails 36 are in the position shown in Fig. 11 midway between pairs of container guides 39 and ready to receive a tier of containers from the lifting head 29 when it is at the upper end of its stroke. However, when roller 132 is raised by the high part of cam 131 rails 36 are shifted to the right into vertical alignment with guides 39 (Fig. 12) and the parts are thus in position for the descent of lifting head 29 carrying lifting devices 31 downwardly between both the guides 39 and the rails 36 to lift the first or upper tier of cans out of a shipping case.

In like manner rail sections 38 for the third unloading station 26 are mounted in a pair of cross bars 139 which are carried at their right-hand ends (Fig. 9) on short arms 140 also keyed to actuating shaft 129, and at their left-hand ends on short arms 141 mounted loosely on shaft 130. Accordingly, rail sections 38 are shifted simultaneously with rail sections 36 and move back and forth between the full line position and the dotted line position of Fig. 9. It will be understood that cam 131 shifts both rail sections 36 and 38 in timed relation to the vertical reciprocation of the two lifting heads 29 and 33.

Referring now to Figs. 3, 10 and 13, which illustrate the shifting of the parts (rails and guides, and sections of the partitioning chute) at the second unloading station 25 two pairs of laterally shiftable elongated vertical frames 142 and 143 are provided. One frame of each of these pairs is located at each end of the rail and guide sections for this unloading station. These two pairs of frames are shifted simultaneously in opposite directions to separate the two groups of rails and guides and the upper and lower portions of guide chute 28. One group consists of supporting rails 37a, lower guides 42a and upper guides 40a which are fixed adjacent their opposite ends to frames 142. The other group comprises rails 37b, guides 42b, and guides 40b which are similarly supported on frames 143.

In order to mount these two pairs of frames 142 and 143 for such simultaneous shifting in opposite directions, frames 143 are supported at their ends by a pair of upwardly directed arms 144 and 145, being pivotally connected to the upper ends of these arms. Arms 144 are both keyed to shaft 129 and arms 145 are both loosely mounted on shaft 130.

Frames 142 are similarly supported on two pairs of arms 146 and 147 which are of the same length as arms 144 and 145. Arms 146 are both keyed to the longitudinal shaft on the opposite side of the machine, that is, shaft 130. Arms 147 are loosely mounted on shaft 129.

The two pairs of frames 142 and 143 are shifted simultaneously in opposite directions by the simultaneous rocking of shafts 129 and 130 in opposite directions and to the same extent. The rocking of shaft 129 by means of cam 131 has been previously described. Shaft 129 may be rocked by a similar cam (not shown) but in the embodiment illustrated it is actuated by means of a link 148 which is pivoted at one end to a short upwardly extending arm 149 keyed to shaft 129 and at its opposite end to a downwardly extending arm 150 which is keyed to shaft 130.

The upper section of chute 28 is supported on two longitudinally extending bars 151 (Figs. 5 and 10) which are supported at their ends by frames 142. The lower part of chute 28 is supported on two longitudinally extending bars 152 which are fixed at their ends to the second frame 143. Hence when these two frames are shifted in one direction the two chute sections are separated from each other as shown in Fig. 13, and when shifted in the opposite direction the chute sections are brought together again as shown in Fig. 10 ready to receive the partitioning from lifting head 30.

Returning now to the mechanism for handling the cases, as they are brought to the first unloading station 24 the automatic timing mechanism 4 (Fig. 1) receives the cases from a supply conveyor (not shown) along which they are fed to the timer. The front of each case arriving at a stop roller 153 the case is momentarily arrested and, at the proper instant to time it with one of the flight bars 14, is lifted over stop roller 153 by the tilting of a section 154 of belt conveyor. This belt conveyor section is pivoted at 155 to the machine frame and when the left-hand end is raised serves to propel the case over the stop roller.

The belt of conveyor 154 is operated by means of a chain 156 which is trained around a large sprocket on the shaft of sprocket 16 which supports the right-hand end of flight bars 15. Timing mechanism 4 is operated by a chain 157 driven from the same shaft. The details of the construction and operation of this timing mechanism are set forth in United States Patent No. 2,324,401, granted July 13, 1943, to Wallace D. Kimball, and assigned to the same assignee as the present application.

In order to open the flaps at the top of the cartons so that the lifting heads at the unloading stations 24, 25 and 26 may enter the cases to remove the contents, the mechanism shown in Figs. 6, 7 and 1 is provided. As each case is received in front of a flight bar 14 from the timer 4 it is brought past the outer flap opening devices 22. First it is pushed forward between a pair of yieldingly mounted rollers 158 which squeeze the sides of the case and cause the outer or side flaps to open slightly as shown in these two Figures 6 and 7. Rollers 158 are mounted respectively on two lever arms 159 carried on vertical pivots 160 which are fixed to the frame of the machine near the tops of the cases so as to support rollers 158 approximately in line with said guides 13. Lever arms 159 are provided with coil springs 161 which urge the rollers 158 inwardly.

The initial opening of the outer flaps by the squeezing pressure of rollers 158 is sufficient to permit the ends of two stationary unfolding devices 162 in the form of warped surfaces to enter beneath them. As the case is pushed forward these warped surfaces unfold the outer flaps, turning them each upwardly through an angle of 180° until they occupy the outwardly extended horizontal positions shown at the left of Fig. 7. These flaps are maintained in their positions throughout the travel of the cases past the three unloading stations by means of two horizontal rods 163 which extend from the left-hand end of the unfolding devices 162.

The inner flap opening mechanism which operates while the case is at the opening station indicated by numeral 23 comprises a pair of thin blade-like arcuate members 164 and 165 which are arranged to rotate in opposite directions on two parallel shafts 166 and 167. As shown in Fig. 7 these rotary members each operate between the containers of two adjacent rows and are thin enough to pass between the containers. The end of rotary blade 164 engages the under side of the forward end of the front inner flap and raises it from the full line position to approximately the dotted line position 168. Similarly, rotary blade 165 opens the rear inner flap to approximately the dotted line position 169.

The forward inner flap has been lifted high enough to permit the entrance beneath it of a second arcuate member 170 which is fixed at its trailing end to a radial arm 171 secured to a cross shaft 172 which is supported in suitable brackets substantially vertically above the front wall of the case as shown in Figs. 6 and 1. The action of arcuate member 170 is to swing the forward inner flap about its hinge to approximately the position shown in Fig. 6, where its forward edge is low enough to pass underneath container supporting rails 36.

The rear inner flap 169 is swung about its hinge to a similar position merely by engagement with the ends of rails 36. These inner flaps are maintained in their positions by rails 36 at the first unloading station 24, by rails 37a and 37b at the second unloading station 25, and by rails 38 at the third unloading station 26.

Shafts 166, 167 and 172 of the flap opening devices 164, 165 and 170 are rotated continuously but in timed relation to the flight bars 15. The drive is by means of an endless chain 173 (Figs. 1 and 3) from a sprocket on shaft 94 to a sprocket on shaft 172. A second chain 174 from a second sprocket on shaft 172 is trained around a sprocket on shaft 166. Shaft 167 is driven by gearing from shaft 166.

The main driving mechanism for operating the various parts of the apparatus, together with the mechanism for simultaneously reciprocating the three lifting heads 29, 30 and 33 will now be described. The apparatus is driven by an electric motor 174 which is mounted adjacent the front end of housings 7 and 8 (Figs. 1, 4 and 8). A chain which is trained over a sprocket on the motor shaft drives a sprocket 176 which is keyed to a short sleeve 177 (Fig. 8) which is mounted for rotation on shaft 72 within housing 8. On the inner end of sleeve 177 there is keyed a pinion 178 which drives a large gear 179 keyed to the main operating shaft 100 of the apparatus. This shaft rotates continuously.

The intermittent drive mechanism for operating the case flight chain 15 and container flight chain 43, and also for operating the lifting heads 29, 30 and 33, is located within housing 7. This mechanism comprises a modified Geneva gear mechanism which will be described in detail later. For present purposes this mechanism comprises a continuously rotating driver 180 which is keyed at the end of main shaft 100 and which actuates the intermittently rotated driven members 181 and 182. Driven member 181 is keyed on the end of a shaft 183 which is parallel to shaft 100 and disposed in the rear of shaft 100. Driven member 182 is keyed to shaft 72 which is similarly disposed in front of shaft 100.

The arrangement of the intermittent drive mechanism is such that driven member 181 makes one complete revolution while driver 180 turns through an angle of 135°, member 181 then being held stationary during the remainder of each complete rotation of driver 180. The operation of driven member 182 is similar. These two members being disposed on opposite sides of driver 180 the rotation of each takes place while the other is held stationary.

Driven member 181 operates the case flight chain 15 and the container flight chain 43 through the connections about to be described, and also, through member 182, operates the three lifting heads 29, 30 and 33, lifting head 29 being reciprocated directly by shaft 72 and lifting heads 30 and 33 being operated through connections heretofore described, including chains 66 and 58 (Fig. 2). Hence, while the flight chains are moving the cases and containers along guideways 9 and 35 respectively, the lifting heads remain stationary and, vice versa, the chains remain stationary while the lifting heads are removing the containers and partitioning from the cases at the three unloading stations 24, 25 and 26.

Returning to the driving connections for flight chains 15 and 43, driven member 181 of the intermittent driving mechanism actuates shaft 183 and on the rear end of this shaft there is a sprocket 184 around which is trained an almost vertical endless chain 185 (Figs. 1 and 4) which drives a shaft 186 mounted for rotation in brackets secured to the superstructure frame 50. This shaft is operatively connected by gearing to rotate an adjacent shaft 187 on which driving sprocket 49 of container flight chain 43 is keyed.

While the container flight chain 43 is operated directly from shaft 183 as just described, the case flight chain 15 is operated from this shaft through reducing gearing. This gear train commences with a gear 188 keyed to shaft 183 and which meshes with a gear 189 keyed to the end of a sleeve 190 which rotates on main shaft 100. At the opposite end of this shaft there is a third gear 191 meshing with a fourth gear 192 to drive a second sleeve 193 mounted for rotation on shaft 183 and on which sprockets 17 which drive the case flight chain 15 are mounted.

Figs. 22 to 27 inclusive supplement Figs. 4 and 8 in illustrating the details of the construction and operation of the modified Geneva gear mechanism which provides the intermittent motion of the intermittent drive mechanism. The two driven members 181 and 182 are constructed exactly alike and are each actuated by the same driving parts on the driver 180. These driving parts include a gear segment 194 and two driving pins, an accelerating pin 195 at the leading end of gear segment 194 and a decelerating pin 196 at the trailing end of segment 194.

The teeth of gear segment 194 are mounted on the periphery of a disk or wheel-like body 197. The pins 195 and 196 are mounted between two arcuate plates 198 which are bolted to the opposite sides of body member 197 (Fig. 8) and extend arcuately a somewhat greater distance than gear segment 194. The ends of these plates 198 terminate in outwardly projecting lugs which carry respectively the two pins 195 and 196 between them. The center lines of these pins are disposed substantially at the pitch line of the gear teeth 194 (Fig. 27) and the pins are supported by plates 198 centrally of two recesses 199 and 200 in the body member 197.

The driven members 181 and 182 each have a body portion 201 containing a series of gear teeth 202. Bolted to the faces of pinion body 201 are heavy plates 203 having portions which extend outwardly beyond teeth 202 and in which are formed laterally aligned pairs of curved accelerating slots 204 and decelerating slots 205. Gear teeth 202 extend around the greater portion of the periphery of body portion 201 but there are no teeth between the centers of the bottoms of slots 204 and 205. The number of teeth 202 corresponds to the number of teeth on segment 194.

Accelerating pin 195 coacts with the accelerating slots 204 and decelerating pin 196 with decelerating slots 205. These two pins are preferably provided with friction reducing rollers, as indicated in Fig. 8, to engage these slots. Plates 203 are also provided, at a location radially outward from slots 204 and 205, with arcuate locking members 206. The arcuate surfaces of these members, when the driven members 181 and 182 are in the angular positions shown in Fig. 22, coact with circular grooves 207 formed along the opposite edges of the periphery of the wheel-like body portion 197 of driver 180 and which extend around this member opposite gear segment 194. The cooperation of the arcuate locking members 206 with these grooves 207 locks the driven members 181 and 182 in such a manner as to prevent their rotation during the greater portion of each revolution of driver 180.

An actuation of driven member 181 by driver 180 throughout one complete revolution is illustrated in Figs. 22, 4, and 23 to 26, inclusive. In Fig. 22 the accelerating pin 195 is just entering the accelerating slots 204. The initial portions of these slots coincide with the path of pin 195 so that no rotation of member 181 has yet taken place. The recess 199, however, has moved opposite one-half of the arcuate locking member 206, that is to say, the tongue 208 at the leading edge of the recess is at the center line between the centers of the driver 180 and the driven member 181, so that the motion of the driven member can now commence.

As pin 195 moves further into slots 204 it begins to move the driven member in the direction of the arrow and since slots 204 curve toward the center of driven member 181 the angular velocity of member 181 increases until the center of pin 195 reaches the center line referred to above (Figs. 4 and 27). The curvature of slots 204 is such that during this movement of pin 195 driven member 181 has been accelerated smoothly to the point where the angular velocity of the teeth 202 is equal to that of the teeth 194 and these two sets of teeth are brought into mesh with each other. In Fig. 27 the first tooth of segment 194 is just engaging the first working tooth of teeth 202. From the position of the parts shown in Fig. 4 to the position shown in Fig. 23, these slots 204 are being disengaged from accelerating pin 195 and the teeth of segment 194 continue to drive the teeth 202 rotating driven member 181 to the position shown in Fig. 24. At this instant decelerating pin 196 enters decelerating slots 205 and the rotation of driven member 181 continues at constant velocity until decelerating pin 196 reaches the center line between the driving and driven shafts 100 and 183 (Fig. 25).

At this instant the last tooth of gear segment 194 unmeshes from the teeth 202 and the further motion of shaft 183 is imparted to it by the engagement of decelerating pin 196 with decelerating slots 205. As shown in Fig. 25, recess 200 receives the leading end of locking member 206. The motion of driven member 181 from the position shown in Fig. 25 to that shown in Fig. 26 is one of deceleration, that is to say, the slots 205, extending outwardly from the center of member 181, being arranged in a position which is symmetrical to slots 204, cause the angular velocity of member 181 to decrease until it becomes zero and member 181 stops rotating. Locking member 206 is again locked by the engagement of its arcuate surfaces with the grooves 207 of driver 180. Decelerating pin 196 leaves slots 205 and member 181 remains stationary until driver 180 has made somewhat less than three-fourths of a revolution and accelerating pin 195 again reaches the position shown in Fig. 22 and comes into engagement with accelerating slots 204.

It will be understood that the driven member 182 is operated in a manner similar to that just described in connection with driven member 181, its operation taking place during the time that member 181 remains stationary.

The various modifications of the unloading apparatus shown in Figs. 15 to 21 inclusive will now be referred to. In Fig. 15 there is illustrated a modified form of lifting head having external grippers 78a instead of the internal grippers 78 previously described. These may be used in place of the lifting devices 31 on lifting head 29 at the first unloading station and in place of lifting devices 34 of lifting head 33 at the third unloading station. Where this substitution is made it will be understood that the apparatus may be used for unloading bottles from shipping cases instead of open mouth empty jars. With both lifting heads 31 and 33 so equipped the apparatus will unload shipping cases containing two tiers of bottles, but more frequently the shipping case will contain only one tier of bottles as shown in Fig. 15, in which event the unloading apparatus may be provided with only a single lifting head.

When a lifting head is equipped with the external lifting devices of Fig. 15 it will lift a tier of bottles consisting, for example, of four rows of six bottles each, out of the shipping case and deposit them on the rails 36 in the manner previously described in connection with the open mouth jars. The arched cross members 39'b which support the bottle guides 39b are similar to the arched frame members 39' previously referred to, but because of the height of the bottles these arched members are higher than members 39' and the guides 39b are provided with extensions 209 to connect them with the arched cross members.

The external gripping devices 78a are supported and actuated by mechanism which is identical with that previously described in connection with Fig. 12, and the corresponding parts are indicated in Fig. 15 by the same reference numerals with the addition of subscript "b." The only difference in operation is that bar 82 (Fig. 12) is shifted to the left to release the jars, whereas bar 82b (Fig. 15) is shifted to the right to release the bottles.

Referring to Figs. 16 and 17, there is here shown a suction type of lifting head which may be used in place of lifting heads 29 for the first unloading station and 33 for the third unloading station, should it be desired to unload cases filled with flat top containers made either of magnetic or non-magnetic material. In these figures, for example, the containers 210 are made of paper, cardboard, or similar material, such as are used for salt.

This suction type of lifting head, which is indicated generally by reference numeral 211, is constructed exactly like lifting head 30 for the second unloading station except that it has more suction cups 32a, there being twenty-four of these, or one for each of the containers in a tier. It will be understood that a lifting head 211 is to be mounted on each of carriages 52 and 68, at the first and third unloading stations, which are reciprocated vertically to lift the respective tiers out of the cases as previously described.

The remaining parts of this mechanism, except cam shaft 212, are identical with the parts previously described in connection with Figs. 5 and 10 for controlling the suction of lifting head 30 at the second unloading station, and are indicated in Fig. 16 by the same reference numerals with the subscript "a" added thereto. Cam shaft 212, however, is appropriately supported on frame 50 at the first unloading station 24, and a similar cam shaft at the third unloading station 26, and each of these cam shafts is rotated in timed relation to the operation of the lifting heads by any suitable connection such, for example, as chains similar to chain 125 (Fig. 1).

In Figs. 18 and 19 there is illustrated a further modified form of lifting head, indicated generally by reference numeral 213, which is of the magnetic type employing permanent magnets. This is advantageous to use where the containers have tops of magnetic material or are made entirely of such material, as, for example, the coffee cans 214. A series of permanent magnets 215 are secured beneath a supporting plate 216 which is mounted on reciprocating carriage 52. A similar lifting head is mounted on reciprocating carriage 66 for the third unloading station.

When carriages 52 and 66 descend magnets 215 are brought into engagement with the tops of the coffee cans of the upper and lower tiers respectively, to lift them out of the shipping case. When the carriages reach the upper ends of their strokes the cans are released from magnets 215 by means of a stripping mechanism not unlike that described in connection with Figs. 5 and 10. This mechanism includes a stripping member 217 having portions disposed between the various magnets 215.

This stripping member is actuated by means of a yoke 218 which is connected with the stripping member by means of four posts 219, the stripping member being normally maintained in its upper position shown in Fig. 18 by means of coil springs on these posts.

Yoke 218 is depressed to actuate the stripping member 217 by mechanism which is exactly like that described in connection with Figs. 5, 10 and 16 and operated by means of a cam shaft 212a, except that actuating rod 113b may be somewhat longer than actuating rods 113 and 113a. This mechanism is indicated by the same reference numerals used in connection with Fig. 16. Magnets 215 are preferably mounted on their supporting plate 216 by means of a yieldable or floating mounting, such as is illustrated in Figs. 20 and 21.

The operation of the stripping mechanism causes the coffee cans 214 to be deposited on the three rails 220a and 220b which take the place of rails 36 at the first unloading station and rails 36 at the third unloading station. Rails 220a and 220b are shifted laterally to allow the downward and upward travel of lifting head 213, rail 220a being shifted to the left and the two rails 220b being shifted to the right. It will be understood that these two groups of rails are supported and shifted by mechanism similar to that described in connection with Figs. 3, 10 and 13 for supporting and shifting the groups of rails 37a and 37b at the second unloading station.

The improved apparatus of the present invention operates automatically to unload articles of various kinds, such as different sorts of containers for food and other products, from shipping cases, the operation being substantially continuous. The cases are received at one end of the machine from a supply conveyor and the removed articles and empty cases are delivered at the opposite end of the machine on separate conveyors by which they can be transported to any further point desired. The apparatus operates automatically and substantially without attention.

Although several modifications of the apparatus have been referred to above it will be understood that the invention extends in scope beyond these particular modifications and that other changes may be made both in the construction and arrangement of the various parts of the machine without departing from the spirit of the invention, the appended claims being included to indicate the extent of the protection to which applicants believe themselves to be entitled and in these claims it is to be understood that the term "container" is a general term intended to include containers made of sheet metal, glass, paper or fiber, as well as other articles.

We claim:

1. In apparatus for unloading shipping cases filled with containers having partitioning between them, case and container guideways disposed parallel with one another and having two unloading stations spaced therealong, a conveyor for partitioning, means at the first unloading station for transferring to the container guideway a container tier from a case in the case guideway, means at the second unloading station for transferring the partitioning from said case to said partitioning conveyor, means for advancing the case in the case guideway to said stations successively, and means for advancing the containers in the container guideway.

2. In apparatus for unloading shipping cases filled with tiers of containers and partitioning therefor, parallel case and container guideways a plurality of unloading stations disposed along the same, a conveyor for partitioning arranged transversely of said guideways, means at the first of said stations for transferring to the container guideway the uppermost container tier from a case in the case guideway, means at the second of said stations for transferring partitioning to said partitioning conveyor, means at the third of said stations for transferring a lower tier of containers to the container guideway, intermittent drive mechanism to operate said transferring means simultaneously, means for advancing the cases in the case guideway, and means for advancing the containers in the container guideway.

3. In apparatus for unloading shipping cases filled with tiers of containers and having partitioning between the tiers, a case guideway, a container guideway disposed above and parallel therewith, a plurality of unloading stations disposed along the same, a conveyor for partitioning also arranged above said case guideway, means at the first of said stations for lifting and depositing on the container guideway a container tier from above the partitioning in a case in the case guideway, means at the second of said stations for lifting out partitioning and depositing it upon said conveyor, means at the third of said stations for lifting out a tier of containers from below said partitioning, drive mechanism to operate said lifting means simultaneously, means for advancing the cases in the case guideway, and means for advancing the containers in the container guideway.

4. In apparatus for unloading shipping cases, a case guideway, a partitioning chute having separable sections disposed laterally above the case guideway, means for lifting the partitioning out of the case on the case guideway and depositing it upon the chute, means operable to shift the separable sections of said chute laterally to allow the operation of said lifting means in lifting the partitioning and to close said sections prior to the depositing operation of said lifting means, and means for advancing the cases in the case guideway.

5. In apparatus for unloading cases filled with containers, a plurality of unloading stations each including an upwardly reciprocable container lifting head, means for simultaneously reciprocating said lifting heads, means for advancing the cases to said stations successively, and a common conveyor for receiving the containers from the lifting heads at each of said stations.

6. In apparatus for unloading cases filled with tiers of containers and partitioning therefor, a plurality of unloading stations, alternate stations each having an upwardly reciprocable lifting head and adapted to lift respectively a tier of containers above and a tier below the partitioning out of a case, an intermediate unloading station having a lifting head adapted to lift out the partitioning, means for simultaneously reciprocating said lifting heads, and means for advancing the cases to said stations successively.

7. In apparatus for unloading shipping cases, a case guideway, an article guideway adjacent thereto, a reciprocating head adapted to remove articles from a case on the container guideway and transfer them to the article guideway, mechanism carried by said reciprocating head for stripping the articles therefrom onto the article guideway, and actuating mechanism for said stripping means mounted in stationary position on the frame of the machine, said stripping means moving into juxtaposition to said actuating means to be actuated thereby when the lifting head is at the portion of its stroke which is adjacent the article guideway.

8. In apparatus for unloading shipping cases, a case guideway, a support having separable sections disposed above the case guideway, means for lifting articles out of the case on the case guideway and depositing them upon the support, means operable to shift the separable sections of said support laterally to allow the operation of said lifting means in lifting the articles and to close said sections prior to the depositing operation of said lifting means, said lifting means operating between said laterally shifted sections, and means for advancing the cases in the case guideway.

9. In apparatus for unloading cases filled with containers arranged in tiers at different levels, a plurality of unloading stations each including an upwardly reciprocable container lifting head, means for simultaneously reciprocating said lifting heads to different extents corresponding to the difference in level of said tiers, means for successively advancing the cases at a common level to said stations, and a common conveyor for receiving the lifted containers at said respective stations.

10. Apparatus for unloading cases as set forth in claim 9 in which the arrangement is such that, for each advance of the cases from one station to the next, the common conveyor moves the containers at all of the unloading stations out of the apparatus.

11. Apparatus as set forth in claim 9 for unloading cases filled with containers which are separated from one another by partitions and in which apparatus the lifting heads raise the containers between spaced parallel rails forming a part of the common conveyor, said rails serving also to strip the partitions and cases from the containers.

12. In an apparatus for unloading cases filled with containers which are separated from one another by partitions, a case guideway, a conveyor above the case guideway including a plurality of spaced parallel container supporting rails, a lifting head including container gripping devices, means for reciprocating said head to move the container gripping devices below the level of said conveyor to engage containers within a case on the case guideway and lift them above the level of said conveyor, means for shifting said container supporting rails out of the path of said gripping devices prior to their downward travel and after their upward travel returning said container supporting rails beneath the gripping devices to receive the containers from the lifting head, said supporting rails when in non-supporting position being in an overlying position with respect to the partitions and a portion of the cases and serving to strip the partitions and cases from the containers when the containers are lifted.

PAUL E. FISCHER.
EDGAR ARDELL.

References Cited in the file of this patent
UNITED STATES PATENTS

| Number | Name | Date |
|---|---|---|
| 1,342,170 | Hill | June 1, 1920 |
| 1,361,168 | Morton | Dec. 7, 1920 |
| 1,904,720 | Douglass | Apr. 18, 1933 |
| 1,965,745 | Luce | July 10, 1934 |
| 2,119,725 | Stecher | June 7, 1938 |
| 2,181,355 | Yarwood | Nov. 28, 1939 |
| 2,253,283 | Minaker | Aug. 19, 1941 |
| 2,277,688 | Cattonar | Mar. 31, 1942 |
| 2,277,828 | Morgan | Mar. 31, 1942 |
| 2,294,274 | Buxbaum | Aug. 25, 1942 |
| 2,323,852 | Seidel et al. | July 6, 1943 |
| 2,353,736 | Le Frank | July 18, 1944 |
| 2,358,447 | Creamer | Sept. 19, 1944 |
| 2,400,542 | Davis | May 21, 1946 |